(12) United States Patent
Blozy et al.

(10) Patent No.: US 7,481,038 B2
(45) Date of Patent: Jan. 27, 2009

(54) YAW VECTORING FOR EXHAUST NOZZLE

(75) Inventors: Jack T. Blozy, West Hartford, CT (US); Charles M. Willard, South Windsor, CT (US); Nathan L. Messersmith, South Windsor, CT (US); Miquel A. Velazquez, Seattle, WA (US)

(73) Assignee: United Technologies Corporation, Hartford, CT (US)

( * ) Notice: Subject to any disclaimer, the term of this patent is extended or adjusted under 35 U.S.C. 154(b) by 171 days.

(21) Appl. No.: 10/975,656

(22) Filed: Oct. 28, 2004

(65) Prior Publication Data

US 2006/0090452 A1 May 4, 2006

(51) Int. Cl.
*F02K 1/00* (2006.01)
*F02K 1/54* (2006.01)

(52) U.S. Cl. .................................. 60/228; 239/265.19

(58) Field of Classification Search ............ 60/228, 60/230, 231, 762, 39.5, 262, 226.1, 761; 239/265.23, 265.17, 265.19, 127.1, 127.3, 239/265.11, 235.13; 244/53 R
See application file for complete search history.

(56) References Cited

U.S. PATENT DOCUMENTS

| | | | | |
|---|---|---|---|---|
| 3,294,323 A * | 12/1966 | Ernst | ...................... | 239/265.23 |
| 3,296,799 A * | 1/1967 | Fuentes | ........................ | 60/231 |
| 3,354,645 A * | 11/1967 | Hsia | ............................ | 60/204 |
| 3,370,794 A * | 2/1968 | Drewry et al. | ......... | 239/265.17 |
| 3,409,228 A * | 11/1968 | Mehr | ...................... | 239/127.3 |
| 3,563,467 A * | 2/1971 | Marsh et al. | ............ | 239/265.17 |
| 3,687,399 A * | 8/1972 | Tumavicus | .................... | 244/55 |
| 3,749,317 A * | 7/1973 | Osofsky | ................. | 239/265.19 |
| 3,819,117 A * | 6/1974 | Moorhead, Jr. | ........ | 239/265.23 |
| 4,706,453 A * | 11/1987 | Vivace | ......................... | 60/770 |
| 4,718,870 A * | 1/1988 | Watts | ........................... | 440/47 |
| 4,836,451 A | 6/1989 | Herrick et al. | | |
| 4,978,071 A | 12/1990 | MacLean et al. | | |
| 5,261,604 A | 11/1993 | Meyer | | |
| 5,351,888 A | 10/1994 | Taylor et al. | | |
| 5,577,381 A | 11/1996 | Eigenbrode et al. | | |
| 5,687,907 A | 11/1997 | Holden | | |
| 5,706,650 A | 1/1998 | Thayer | | |
| 5,826,794 A * | 10/1998 | Rudolph | ................. | 239/265.17 |
| 5,863,229 A * | 1/1999 | Matte | ........................... | 440/47 |
| 5,884,843 A * | 3/1999 | Lidstone et al. | ........ | 239/265.13 |
| 5,908,159 A * | 6/1999 | Rudolph | ................. | 239/265.17 |
| 5,996,936 A * | 12/1999 | Mueller | ..................... | 244/53 R |
| 6,021,637 A * | 2/2000 | Scavo | ........................... | 60/262 |
| 6,336,319 B1 * | 1/2002 | Koshoffer | ..................... | 60/770 |
| 6,360,528 B1 * | 3/2002 | Brausch et al. | ............... | 60/262 |

(Continued)

OTHER PUBLICATIONS

European Search Report dated Mar. 29, 2006.

*Primary Examiner*—William H Rodriguez
(74) *Attorney, Agent, or Firm*—Carlson, Gaskey & Olds

(57) ABSTRACT

An exhaust nozzle assembly provides fluidic thrust vectoring of the primary stream to enhance aircraft maneuverability. The exhaust nozzle assembly includes a cooling air passage that supplies cooling air to a plurality of cooling holes that generate an insulating layer of air. A vector slot injects cooling airflow into the exhaust passage normal to the primary stream. A cover plate partially blocks the vector slot to direct cooling airflow into the exhaust passage that in turn directs portions of the primary stream.

16 Claims, 3 Drawing Sheets

U.S. PATENT DOCUMENTS 6,470,669 B2 * 10/2002 Jones et al. .................... 60/231
6,679,048 B1 * 1/2004 Lee et al. ....................... 60/204
2006/0283188 A1 * 12/2006 Webster et al. ................ 60/770

* cited by examiner

YAW VECTORING FOR EXHAUST NOZZLE

BACKGROUND OF THE INVENTION

This invention relates generally to an exhaust nozzle for a jet engine. More particularly, this invention relates to an exhaust nozzle providing fluidic yaw vectoring.

Typically, a jet engine includes a compressor providing high-pressure air to a combustor. Fuel and air within the combustor are ignited generating high-speed exhaust gasses that drive a turbine. The exhaust gases exit the jet engine through an exhaust nozzle. The exhaust gases generate thrust that propels the aircraft. The exhaust nozzle directs the exhaust gases to optimize thrust produced by the jet engine.

An aircraft is movable about several axes including a yaw axis. Movement of the aircraft about the yaw axis is typically accomplished by control surfaces, such as a rudder. Directing exhaust gases by moving the exhaust nozzle is also a known method of moving the aircraft about the yaw axis. However, movement of the exhaust nozzle typically requires complicated mechanisms and control systems.

The exhaust gases exiting through the exhaust nozzle are of an extreme temperature. The exhaust nozzle is therefore provided with a layer of cooling air by a plurality of openings within the liner. The layer of cooling air insulates the surface of the exhaust nozzle from extreme temperatures generated by the exhaust gases.

A known yaw vectoring system utilizes high-pressure bleed air directed along different points of the exhaust nozzle to aid in moving the aircraft about the yaw axis. Unfortunately, such a device both reduces engine efficiency by removing air from other systems, and requires complicated tubing and channeling in order to communicate air to the desired location in the exhaust nozzle.

Accordingly, it is desirable to develop a yaw-vectoring device for an exhaust nozzle that is simple and efficient.

SUMMARY OF THE INVENTION

This invention is an exhaust nozzle assembly including fluidic vector control of a primary stream utilizing cooling AIR.

An exhaust nozzle assembly provides fluidic thrust vectoring of the primary stream to enhance aircraft maneuverability. A cooling air passage supplies cooling air to a plurality of cooling holes disposed within an inner duct wall. The flow volume and rate of cooling air is fixed for all operating parameters of the propulsion system. A vector slot injects cooling air into the exhaust passage normal to the primary stream. The vector slot is partially blocked by a cover plate. The cover plate is movable along the vector slot to adjust the location that cooling is injected into the primary stream. An actuator arm is attached to the cover plate and is actuated by a drive.

Injection of cooling air through the vector slot changes a direction of the primary stream. The cooling air creates a barrier across the trailing edge of the exhaust nozzle that restricts the flow of the primary stream. In the centered position a substantially equal amount of cooling air exits the vector slot on opposing sides of the cover plate. This results in equal amounts of primary stream being redirected toward the center of the exhaust nozzle that in turn results in no directional vectoring of the primary stream. Movement of the cover plate to either side restricts desired portions of the primary stream thereby providing the desired vectoring of the primary stream.

The cover plate blocks a fixed area of the vector slot and therefore in any position along the vector slot the same volume of cooling air flows into the exhaust passage. Accordingly, there is no variation in cooling air volume during operation.

Accordingly, the exhaust nozzle assembly of this invention provides thrust vectoring of the primary stream without varying a load on the propulsion system and without complex piping and conduits.

These and other features of the present invention can be best understood from the following specification and drawings, the following of which is a brief description.

DETAILED DESCRIPTION OF THE PREFERRED EMBODIMENT

Figure 1:
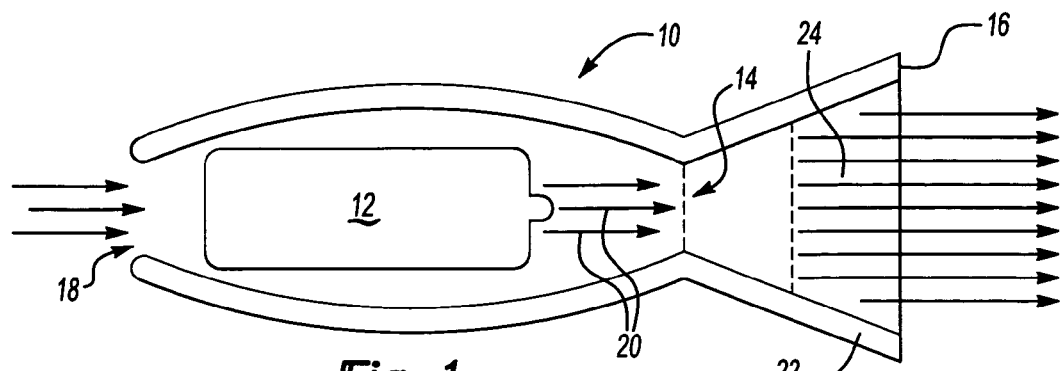
FIG. 1 is a schematic view of a jet engine with a two-dimensional exhaust nozzle.

Referring to FIG. 1, a jet engine assembly 10 is shown and includes a propulsion system 12 that intakes air from an inlet 18 mixes it with fuel and generates a primary stream 20 that provides a desired thrust force. The primary stream 20 exits through an exhaust nozzle assembly 22 that includes an exhaust passage 24. The exhaust passage 24 includes a nozzle throat 14 for accelerating the primary stream 20. The exhaust nozzle assembly 22 provides for the fluidic thrust vectoring of the primary stream 20 to enhance aircraft maneuverability.

Figure 2:
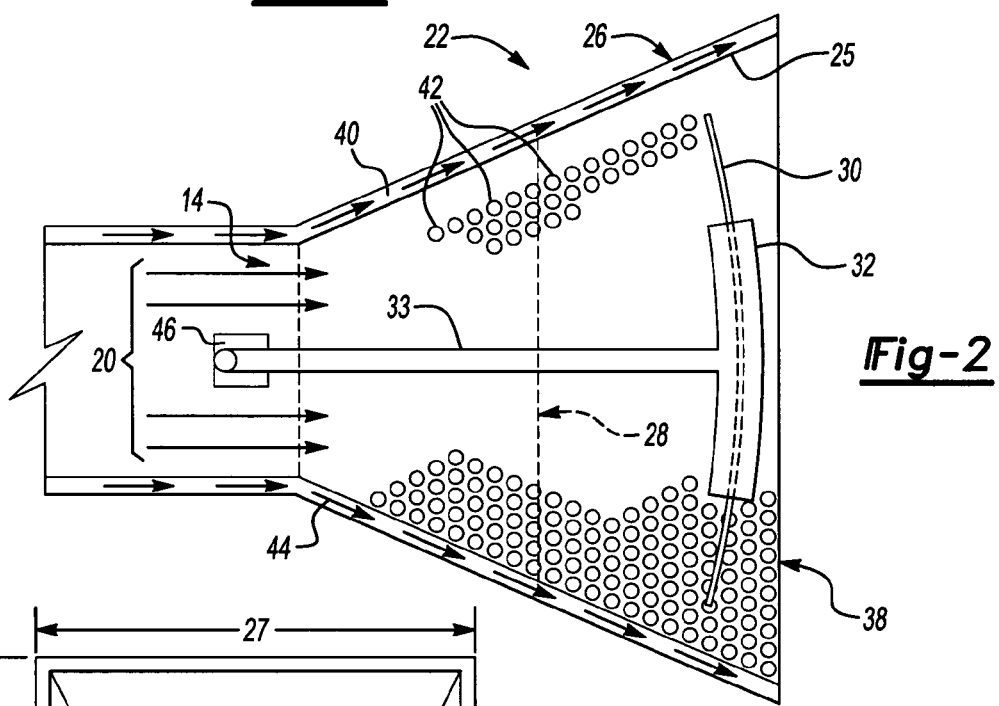
FIG. 2 is a top view of a two-dimensional exhaust nozzle with a yaw-vectoring device according to this invention.
Figure 3:
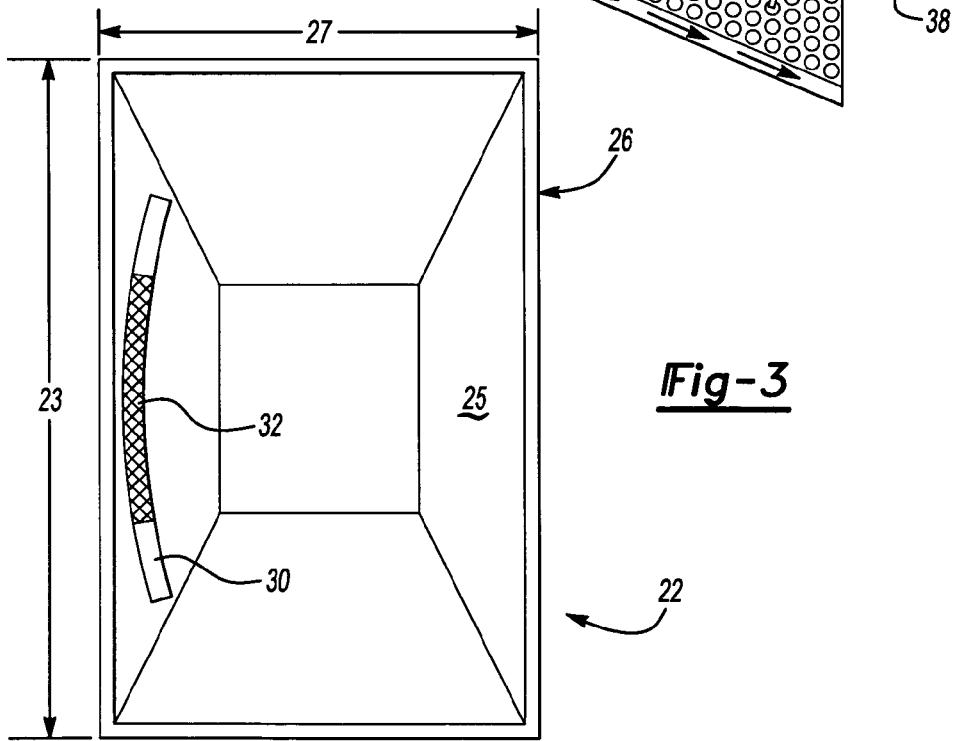
FIG. 3 is an end view of an exhaust nozzle according to this invention.

Referring to FIGS. 2 and 3, the exhaust nozzle assembly 22 is rectangular with a high aspect ratio. Preferably, the exhaust nozzle assembly 22 includes a width 23 that is greater than a height 27 by a factor greater than seven and preferably a factor of nine. The exhaust nozzle assembly 22 includes a trailing edge 38. The exhaust nozzle assembly 22 is convergent and divergent. The exhaust passage 24 necks down to a smallest cross-sectional area at the nozzle throat 14, and increases cross-sectional area from the nozzle throat 14 to the trailing edge 38. The height 27 and width 23 at the trailing edge 38 provide the greatest cross-sectional area of the exhaust passage 24. The distance between the trailing edge 38 and the nozzle throat 14 is determined on an application specific basis. A worker versed in the art would understand that different geometries of exhaust passage 24 are within the contemplation of this invention.

The exhaust nozzle assembly 22 includes an inner duct wall 25 and an outer duct wall 26 spaced apart from each other to define a cooling air passage 40. The cooling air passage 40 supplies cooling air 44 to a plurality of cooling holes 42 disposed within the inner duct wall 25. The flow of cooling air 44 through the cooling holes 42 creates an insulating layer of air along the inner duct wall 25. The cooling air 44 insulates the inner duct wall 25 from the high temperature of the primary stream 20. The volume and rate of cooling air 44 is fixed for all operating parameters of the propulsion system 12. The fixed and constant flow of cooling air 44 prevents undesirable fluctuations in propulsion system 12 performance.

The exhaust nozzle assembly includes a vector slot 30 that injects cooling air 44 into the exhaust passage 24 normal to the primary stream 20. The vector slot 30 is partially blocked by a cover plate 32. The cover plate 32 blocks approximately half of the vector slot 30. The cover plate 32 is movable along the vector slot 30 to adjust the location that cooling air 44 is injected into the primary stream 20. An actuator arm 33 is attached to the cover plate 32 and is actuated by a drive 46.

The vector slot 30 includes an apex 34 and distal ends 36. The apex 34 of the vector slot 30 is disposed near the trailing edge 38. Preferably, the vector slot 30 is disposed as far way from the nozzle throat 14 as is practical in order to prevent possible adverse affects to the flow of the primary stream 20. In other words, the vector slot 30 is placed within the exhaust nozzle assembly 22 such that it does not interfere with the flow geometry of the primary stream 20 through the nozzle throat 14.

Figure 4:
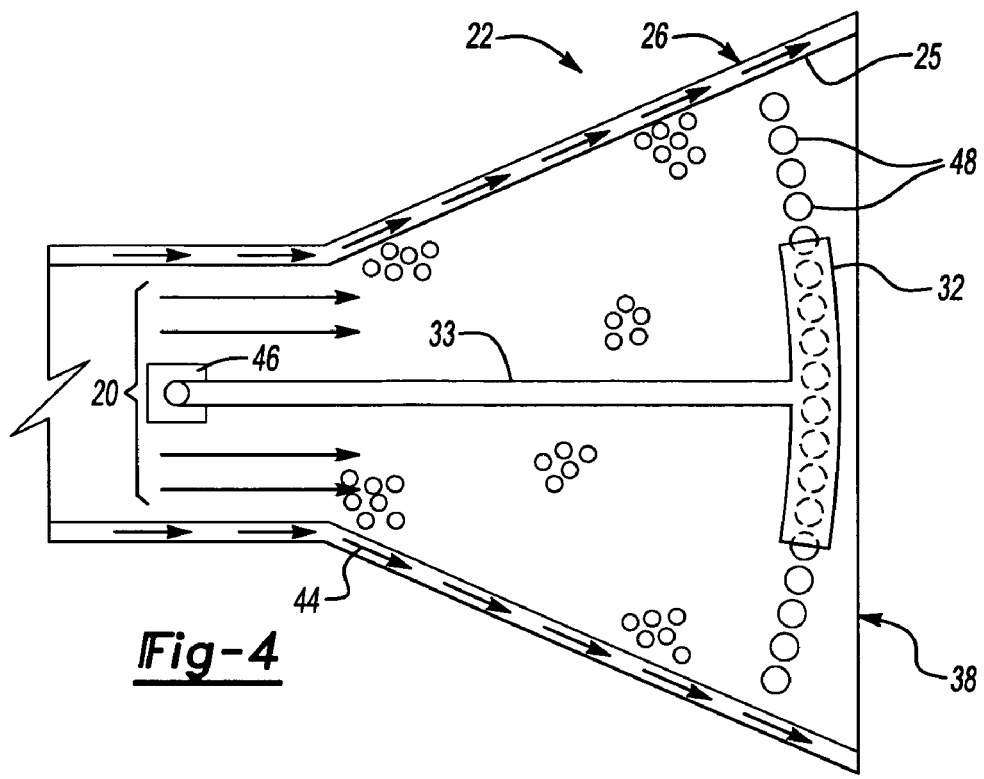
FIG. 4 is a top view of another exhaust nozzle according to this invention.

Referring to FIG. 4, another embodiment of the exhaust nozzle assembly 22 is shown that includes a series of vector holes 48 disposed in an arc. The cover plate 32 blocks a portion of the holes 48 to direct cooling air 44 injected into the primary stream 20. Although, a slot and holes are discussed and illustrated, it is within the contemplation of this invention to use other shapes of openings known to a worker skilled in the art.

Figure 5:
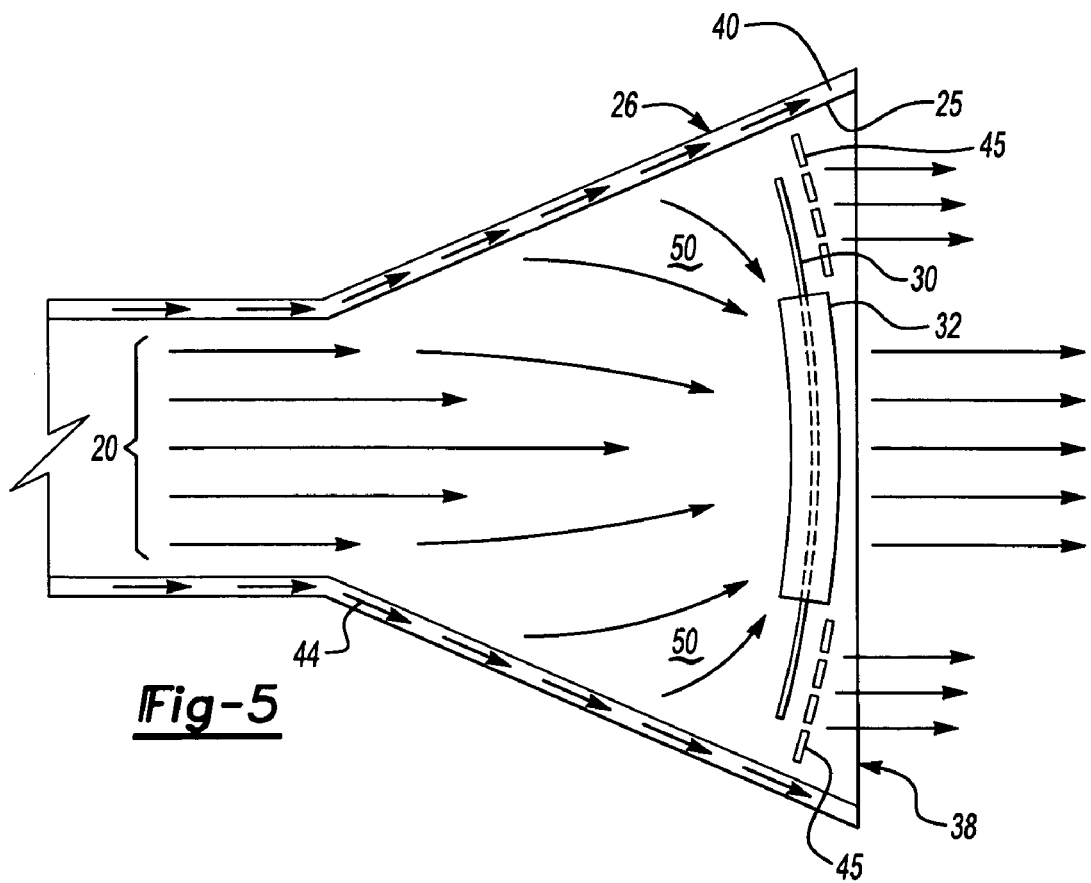
FIG. 5 is a sectional view of the exhaust nozzle with the yaw vectoring device in a center position.

Referring to FIG. 5, vectoring of the primary stream 20 is accomplished by the injection of the cooling air 44 through the vector slot 30 and into the exhaust passage 24. The cooling air 44 creates a barrier, or blocked areas schematically shown at 45 across the trailing edge 38 that restricts the flow of the primary stream 20. The resistance to airflow in the blocked areas 45 causes the primary stream to move toward areas of less resistance. The primary stream 20 reacts by bending or flowing to the area of least resistance where no barrier to flow exits. The cooling air 44 injected into the exhaust passage 24 creates the barrier by generating high-pressure regions 50. The high-pressure regions 50 create the resistance to the flow of the primary stream 20. The resistance caused by the high-pressure regions 50 does not prevent flow, but provides a resistance to flow of the primary stream that redirects a substantial portion of the primary stream. 20.

As appreciated a clear region 52 is disposed where the cover plate 32 is located in the slot. The clear region 52 does not include cooling air 44 and therefore provides less resistance to flow in the high-pressure regions 50. The primary stream 20 flows unimpeded through the clear region 52. The cover plate 32 is shown substantially in a centered position within the exhaust nozzle assembly 22. In the centered position a substantially equal amount of cooling air 44 exits the vector slot 30 on opposing sides of the cover plate 32. This results in equal amounts of primary stream 20 being redirected toward the center of the exhaust nozzle 22 that in turn results in no directional vectoring of the primary stream 20.

The injection of cooling air 44 as described in this invention is utilized to provide thrust vectoring that enhances movement about a yaw axis. As is generally understood, the yaw axis is perpendicular to a direction of motion of an aircraft. As will be understood by a worker versed in the art. Although the invention illustrates a configuration for providing thrust vectoring about the yaw axis, positioning of the vector slot 30 within side walls of the exhaust nozzle assembly 22 would provide for thrust vectoring that would enhance movement about other axes, such as the pitch and roll axis.

Figure 6:
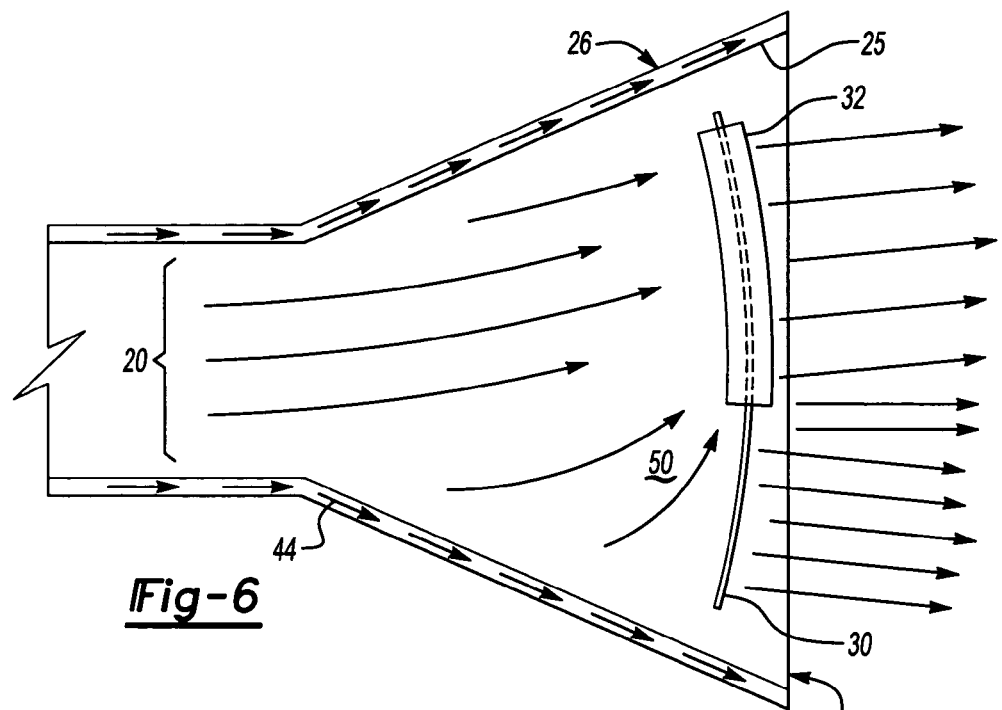
FIG. 6 is a sectional view of the exhaust nozzle with the yaw vectoring device in an off-center position.

Referring to FIG. 6, the exhaust nozzle assembly 22 is shown with the cover plate 32 moved to substantially one side of the vector slot 30. Cooling air 44 exiting the vector slot 30 generates the high-pressure region 50 to one side of the exhaust nozzle assembly 22 thereby directing a majority of the flow of the primary stream 20 to exit one side of the exhaust nozzle assembly 22. This directional control of the primary stream 20 provides the desired directional thrust utilized to enhance maneuverability of the aircraft.

The cover plate 32 blocks a fixed area of the vector slot 30 and therefore does not generate variations in the flow of air 44. In any position along the vector slot 30 the cover plate 32 blocks the same area, and therefore blocks the same volume of cooling air 44. The constant flow of cooling air 44 is desirable because no variation is encountered by the propulsion system 12.

Figure 7:
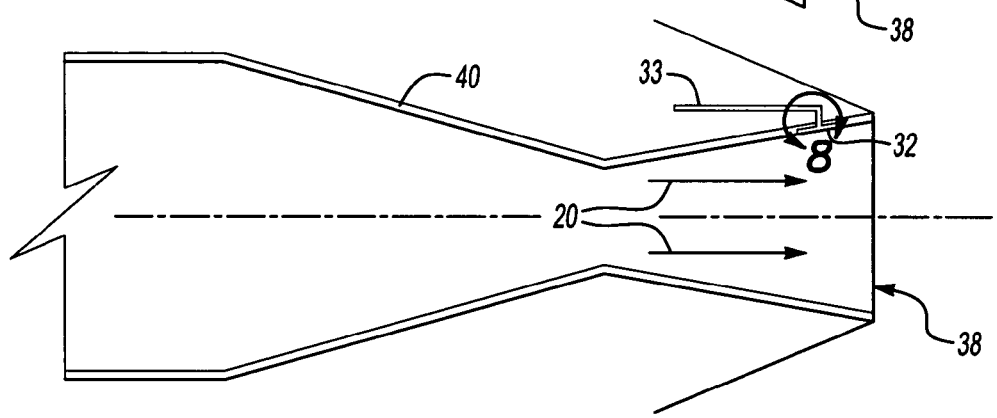
FIG. 7 is an enlarged view of a portion of the nozzle liner.
Figure 8:
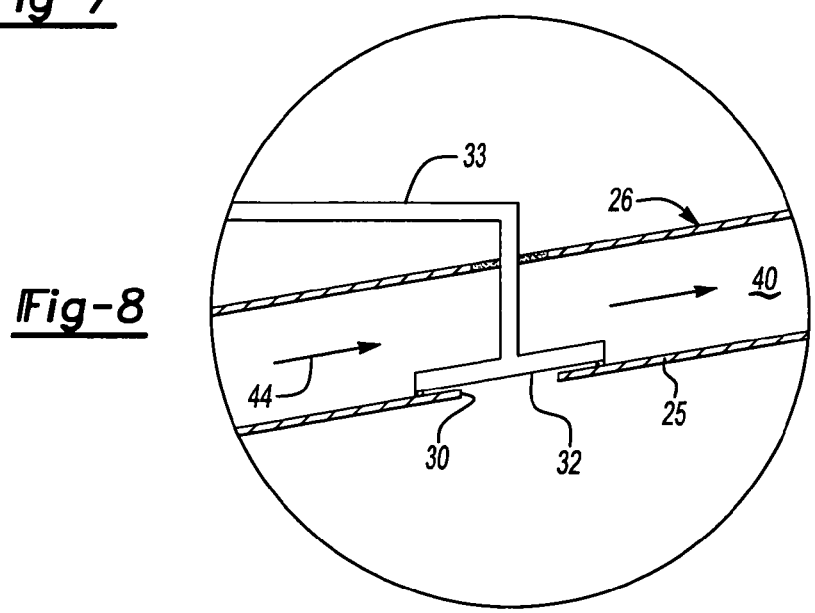
FIG. 8 is an enlarged view of a portion of the cover plate.

Referring to FIGS. 7 and 8, a cross-sectional view of the exhaust nozzle assembly 22 is shown and includes the cover plate 32 disposed within the passage 40. The cover plate 32 remains within the passage 40 and therefore does not interfere with the flow of the primary stream 20. Further, the cover plate 32 and actuation arm 33 are not required to withstand the extreme temperatures within the exhaust passage.

The arm 33 extends rearward from the trailing edge 38 and therefore is shielded from temperatures within the exhaust nozzle 22. The arm 33 supports the plate 32. The plate 32 covers the slot 30 and overlaps sides adjacent the slot 30 such that leakage of cooling air 44 past the plate 32 in areas not desired is minimized.

The exhaust nozzle assembly 22 of this invention provides fluidic thrust vectoring of the primary stream that enhances aircraft maneuverability without undesirable fluctuations in demands on the propulsion system. Further, the component parts of the fluidic vectoring device are shielded from extreme temperatures within the exhaust nozzle to substantially eliminate the use of special materials capable of withstanding such extreme temperatures.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust nozzle assembly for fluidic vectoring of a primary stream comprising:
   an exhaust passage for directing a primary stream;
   a duct wall defining an airflow passage for cooling air;
   a vector slot within said duct wall open to said exhaust passage providing a flow of cooling air from said airflow passage into said exhaust passage; wherein said vector slot is arc shaped having an apex and distal ends, said apex disposed downstream of said distal ends; and
   a cover movable for blocking a portion of said flow of cooling air from said airflow passage into said exhaust passage for selectively directing said primary stream.

2. The assembly as recited in claim 1, wherein said exhaust passage comprises a trailing edge and said apex is disposed closer to said trailing edge than said distal ends.

3. The assembly as recited in claim 1, wherein said slot is of a constant width.

4. The assembly as recited in claim 1, including an actuator arm attached to said cover for selectively positioning said cover over a portion of said vector slot.

5. The assembly as recited in claim 4, wherein said cover selectively directs said flow of cooling air into said exhaust passage to provide yaw vectoring.

6. The assembly as recited in claim 1, wherein the flow of cooling air through said vector slot is normal to a primary jet stream through said exhaust passage.

7. An exhaust nozzle assembly for fluidic vectoring of a primary stream comprising:
   an exhaust passage for directing a primary stream, wherein said exhaust passage is rectangular;
   a duct wall defining an airflow passage for cooling air;
   a vector opening within said duct wall open to said exhaust passage providing a flow of cooling air from said airflow passage into said exhaust passage; and
   a cover smaller than said vector opening such that some portion of the vector opening is always open for providing a flow of cooling air into exhaust passage regardless of a position of said cover, said cover movable for blocking a portion of said flow of cooling air from said airflow passage into said exhaust passage for selectively directing said primary stream.

8. An exhaust nozzle assembly for fluidic vectoring of a primary stream comprising:
   an exhaust passage for directing a primary stream;
   a duct wall defining an airflow passage for cooling air;
   a vector opening within said duct wall open to said exhaust passage providing a flow of cooling air from said airflow passage into said exhaust passage, wherein said vector opening comprises a plurality of vector holes disposed within an arc having an apex and distal ends; and
   a cover movable for blocking a portion of said flow of cooling air from said airflow passage into said exhaust passage for selectively directing said primary stream.

9. The assembly as recited in claim 8, wherein said apex is disposed downstream of said distal ends.

10. The assembly as recited in claim 8, wherein said duct wall includes a plurality of cooling holes for said cooling air, wherein said plurality of vector holes are larger than said plurality of cooling holes.

11. The assembly as recited in claim 7, wherein a width of said exhaust passage is approximately nine times a height of said exhaust passage.

12. The assembly as recited in claim 1, wherein said exhaust passage includes a top side, a bottom side and first and second sides between said top side and bottom side, wherein said vector slot is disposed within one of said top side and bottom side.

13. A fluidic vectoring assembly for an exhaust nozzle comprising:
   a cover plate movable within a cooling air passage for selectively blocking a portion of a vector opening, wherein the vector opening is arc shaped for communicating an arc shaped flow of cooling air to an exhaust passage, and said cover plate blocks a portion of cooling air flow into the exhaust passage to modify a direction of flow of a primary stream.

14. The assembly as recited in claim 13, including an actuator arm attached to said cover plate for moving said cover plate to different portions of said vector opening.

15. The assembly as recited in claim 13, wherein said cover plate blocks an equal area of the vector opening for all positions of the cover plate.

16. The assembly as recited in claim 13, wherein said cover selectively directs the flow of cooling air into the exhaust passage to provide fluidic vectoring of the primary stream.

* * * * *